United States Patent [19]
Heimerikx et al.

[11] Patent Number: 5,854,335
[45] Date of Patent: *Dec. 29, 1998

[54] BITUMINOUS COMPOSITION WITH DIENE/ MONOVINYL AROMATIC BLOCK COPOLYMER

[75] Inventors: Gerardus Wilhelmus Jozef Heimerikx; Aloysius Josephus Atoius Maria Van Hoek; Cornelis Petrus Valkering; Jeroen Van Westrenen, all of Amsterdam, Netherlands

[73] Assignee: Shell Oil Company, Houston, Tex.

[*] Notice: This patent issued on a continued prosecution application filed under 37 CFR 1.53(d), and is subject to the twenty year patent term provisions of 35 U.S.C. 154(a)(2).

[21] Appl. No.: 846,950

[22] Filed: Apr. 30, 1997

Related U.S. Application Data

[63] Continuation of Ser. No. 603,819, Feb. 20, 1996, abandoned.

[30] Foreign Application Priority Data

Feb. 20, 1995 [EP] European Pat. Off. .............. 95301053

[51] Int. Cl.$^6$ ................ C08K 5/01; C08L 95/00

[52] U.S. Cl. ............. 524/571; 106/273.1; 106/281.1

[58] Field of Search ................ 524/571; 106/273.1, 106/281.1

[56] References Cited

U.S. PATENT DOCUMENTS

| | | | |
|---|---|---|---|
| 4,129,541 | 12/1978 | Marrs et al. | 260/28.5 |
| 4,530,652 | 7/1985 | Buck et al. | 524/68 |
| 5,420,203 | 5/1995 | Dillman et al. | 525/314 |

FOREIGN PATENT DOCUMENTS

| | | |
|---|---|---|
| 3-143961 | 6/1991 | Japan . |
| 6-41439 | 2/1994 | Japan . |

*Primary Examiner*—Robert E. Sellers
*Attorney, Agent, or Firm*—Donald F. Haas

[57] ABSTRACT

A bituminous composition which comprises a bituminous component and a block copolymer of a conjugated diene and a monovinylaromatic hydrocarbon, wherein the block copolymer has a vinyl content of at least 25% by weight based on the total diene content and a diblock content of 25 wt % or less, whereas the diblock has an apparent molecular weight which is in the range of from 100,000 to 170,000, is of use particularly in roofing applications.

2 Claims, No Drawings

BITUMINOUS COMPOSITION WITH DIENE/MONOVINYL AROMATIC BLOCK COPOLYMER

This is a continuation of application Ser. No. 08/603,819, filed Feb. 20, 1996 abandoned.

The present invention concerns bituminous compositions having advantageous high and low temperature properties which are maintained over time giving an improved estimated service life when used in, for example, roofing applications. These advantageous properties are imparted by the use of a thermoplastic elastomeric block co-polymer having a high vinyl content and a particular diblock content.

Butadiene homopolymers with a high vinyl content (determined by infrared examination essentially the same as that set forth in "The Analysis of Natural and Synthetic Rubbers by Infrared Spectroscopy" H. L. Dinsmore and D. C. Smith in Naval Research Laboratory Report No. P-2861, Aug. 20, 1964) are known from U.S. Pat. No. 3,301,840 and are preparable by utilising a hydrocarbon solvent such as tetrahydrofuran during polymerisation.

U.S. Pat. No. 4,129,541 describes, as a comparison polymer, a block co-polymer which has a vinyl content of 47% by weight (also determined by infrared (IR) techniques) which can be prepared utilising tetrahydrofuran by a process described in U.S. Pat. No. 3,639,521. The authors of U.S. Pat. No. 4,129,541 are seeking an asphalt (also known as bitumen)-containing composition which in use as a pipeline coating in the low temperature environment of off-shore pipeline installations would provide for a longer service life by improving resistance to cracking. Their findings show that at temperatures of 0° C. there is generally a gradual decrease in crack time improvement as the conjugated diene level is increased, regardless of the method of polymer preparation, but that for polymers such as the high vinyl polymer A the crack time is actually decreased (i.e. worse) from that of compositions which contain no polymer at all.

The use of high vinyl conjugated diene/monovinyl aromatic block copolymers as modifiers for rubber-modified-asphalt roofing or water proofing materials is described in U.S. Pat. No. 4,530,652. Such block copolymers have a vinyl content of at least 25%, exemplified as 33, 40 and 45%, based on total diene content, and were found to improve at least one of dispersability in asphalt, viscosity (measured at 177° C.), high temperature flow resistance and low temperature break resistance. Most preferred are said to be radial teleblock copolymers containing 30 to 40% styrene, 40% vinyl unsaturation, and having a number average molecular weight between 150,000 and 250,000. The copolymer asphalt blends tested indeed all show very good low temperature properties but have highly variable and unpredictable high temperature properties for viscosity and flow resistance.

High temperature viscosity is an important parameter for bitumen blend processing, particularly where polymer-modified compositions are prepared by high temperature (in excess of 150° C.), high shear blending. Block copolymer bitumen blends desirably have a viscosity measured at 180° C. of less than 8 Pas, advantageously of 4 Pas or less, and most suitably 2 or 3.

Additionally, polymer-modified bitumens when used as roofing materials in external locations need to have both acceptable high temperature and low temperature properties to be of use in a large number of environments, and to retain those properties over time in order to provide a long service time, thereby delaying, for as long as possible, the need for replacement of the roofing materials.

The polymer-modified asphalt compositions of U.S. Pat. No. 4,530,652 whilst having very acceptable low temperature properties for the main part, have unsuitable high temperature viscosities and/or flow resistant properties for most of the blends disclosed. Indeed the results are so variable for these high temperature properties that it is difficult to draw any conclusions about what sub group of compositions could have both acceptable, and consistent, high and low temperature properties; neither is there any guidance in U.S. Pat. No. 4,530,652 as to the expected service life of the compositions tested.

It has now been found that consistently improved low and high temperature properties can be achieved in a high vinyl content block copolymer modified bitumen and furthermore that such properties are retained over time so as to achieve a longer, expected service life for such bitumens, than for similar bitumen blends with polymers having a diblock content varying from 6 to 10%.

Accordingly, the present invention provides a bituminous composition which comprises a bituminous component and a block copolymer of a conjugated diene and a monovinylaromatic hydrocarbon, wherein the block copolymer has a vinyl content of at least 25% by weight, based on the total diene content, and a diblock content of 25 wt % or less, whereas the block has an apparent molecular weight in the range of from 100,000 to 170,000.

With the term "apparent molecular weight" as used throughout the specification is meant the molecular weight of a polymer except polystyrene itself, as measured with gel chromatography (GPC) using polystyrene) calibration standards (according to ASTM 3536).

By "diblock content", there should be understood the amount of free diblock that is finally present in the prepared block copolymer. Where the block copolymer is prepared via a technique where no diblock is specifically prepared or isolatable, such as in the full sequential preparation method, it is known that the finally desired diblock amount can be adjusted starting from the final polymer weight.

The diblock content is preferably in the range of from 10 to 25 wt % and more preferably from 15 to 25 wt %.

The block copolymer may be either linear or radial; good results have been given by both copolymer types.

The block copolymers, which are useful as modifiers in the bituminous compositions according to the present invention, may be prepared by any method known in the art including the well known full sequential polymerisation method, optionally in combination with reinitiation, and the coupling method, as illustrated in e.g. U.S. Pat. Nos. 3,231,635; 3,251,905; 3,390,207; 3,598,887 and 4,219,627 and EP 0413294 A2, 0387671 B1, 0636654 A1, WO 04/22931.

The block copolymer may therefore, for example, be prepared by coupling at least two diblock copolymer molecules AB together, with A representing a monovinyl aromatic hydrocarbon polymer block and B representing a conjugated diene polymer block, with the resulting block copolymer having the general formula $(AB)_n X$ with n being an integer of 2 or higher and X representing the residue of a coupling agent. The coupling agent may be any di- or polyfunctional coupling agent known in the art, for example, dibromoethane, silicon tetrachloride, diethyl adipate, divinylbenzene, dimethyldichlorosilane, methyl dichlorosilane. Particularly preferred in such a preparation route is the use of non-halogen containing coupling agents, for example gamma-glycidoxypropyl-trimethoxysilane (Epon 825), and diglycidylether of bisphenol A.

Techniques to enhance the vinyl content of the conjugated diene portion are well known and may involve the use of polar compounds such as ethers, amines and other Lewis bases and more in particular those selected from the group consisting of dialkylethers of glycols. Most preferred modifiers are selected from dialkyl ether of ethylene glycol containing the same or different terminal alkoxy groups and optionally bearing an alkyl substituent on the ethylene radical, such as monoglyme, diglyme, diethoxyethane, 1,2-diethoxypropane, 1-ethoxy-2,2-tert-butoxyethane, of which 1,2-diethoxypropane is most preferred.

The apparent molecular weight of diblock (or 'AB') has to be in the range of from 100,000 to 170,000. Preferably, said diblock molecular weight is in the range of from 110,000 to 150,000, more preferably from 115,000 to 125,000.

The content of monovinyl aromatic hydrocarbon of the final block copolymer is suitably in the range of from 10 to 55% by weight, preferably in the range of from 25 to 40, and more preferably 30 to 40, % by weight based on the total block copolymer.

Suitable monovinyl aromatic hydrocarbons include styrene, o-methylstyrene, p-methylstyrene, p-tert-butylstyrene, 2,4-dimethylstyrene, α-methylstyrene, vinylnaphthalene, vinyltoluene and vinylxylene, or mixtures thereof of which styrene being the most preferred.

The total vinyl content of the block copolymer is at least 25% by weight. Preferably the vinyl content is in the range of from 30 to 80 preferably from 35 to 65% and more preferably 45 to 55% by weight.

Suitable conjugated dienes include those having from 4 to 8 carbon atoms, for example 1,3-butadiene, 2-methyl-1,3-butadiene (isoprene), 2,3-dimethyl-1,3-butadiene, 1,3-pentadiene and 1,3-hexadiene. Mixture of such dienes may also be used. Preferred conjugated dienes are 1,3-butadiene and isoprene, with 1,3-butadiene being the most preferred.

It will be appreciated that with the term "vinyl content" actually is meant that a conjugated diene is polymerised via 1,2-addition. Although a pure "vinyl" group is formed only in the case of 1,2 addition polymerisation of 1,3 butadiene, the effects of 1,2 addition polymerisation of other conjugated dienes on the found final properties of the block copolymer and the blends of it with bitumen will be the same.

It is thought that the block copolymer used as modifier in the bituminous composition of the invention may be novel, and therefore the present invention also extends to the polymer per se.

The bituminous component present in the bituminous compositions according to the present invention may be a naturally occurring bitumen or derived from a mineral oil. Also petroleum pitches obtained by a cracking process and coal tar can be used as the bituminous component as well as blends of various bituminous materials. Examples of suitable components include distillation or "straight-run bitumens", precipitation bitumens, e.g. propane bitumens, blown bitumens, e.g. catalytically blown bitumen or "Multiphate", and mixtures thereof. Other suitable bituminous components include mixtures of one or more of these bitumens with extenders (fluxes) such as petroleum extracts, e.g. aromatic extracts, distillates or residues, or with oils. Suitable bituminous components (either "straight-run bitumens" or "fluxed bitumens") are those having a penetration of in the range of from 50 to 250 dmm at 25° C.; therefore quite hard bitumens of a penetration of from 60 to 70 dmm may be used, but generally a straight run or distilled bitumen having a penetration in the range of from 150 to 250 dmm will be the most convenient to use. Both compatible as well as incompatible bitumens may be used.

The polymer modifier is suitably present in the bituminous composition in an amount in the range of from 6, or more preferably 10, to 15% by weight.

The bituminous composition may also, optionally, contain other ingredients such as may be required for the end-use envisaged. Thus fillers may be included, for example talc, calcium carbonate and carbon black, or other components including resins, oils, stabilisers or flame retardants may be incorporated. The content of such fillers and other components may be in the range of from 0 to as much as 40% by weight. Of course, if advantageous, other polymer modifiers may also be included in the bituminous composition of the invention.

The useful low temperature and high temperature properties of the polymer-bitumen blends of the present invention coupled with the improved ageing resistance enables such blends to be of significant benefit in uses where the blends are exposed to external weather conditions, such as use in roofing applications, for example as a component of roofing felt. The usefully low high-temperature viscosity not just means that the polymer-bitumen blends can be more easily processed but also means that they enable a greater amount of filler to be incorporated before the maximum allowable processing viscosity is achieved, and thus leads to a cheaper product in those applications where fillers are commonly used.

Other applications in which the polymers themselves may be of use are in sound deadening, in adhesive, sealant or coating compositions and/or in vibration dampening compositions.

The following Examples illustrate the present invention.

EXAMPLES 1 TO 19

A number of block copolymers of the invention, and for comparison, were prepared by a conventional polymerisation method based on one of the general procedures given below:

A. Preparation of radial coupled block coplymers

B. Full Sequential Polymerisation

General Procedure A

By the following process, the coupled block copolymers of the present invention polymers were prepared:

180 g styrene was added to 6 liters of cylohexane at 50° C., after which 8.31 mmol of sec-butyl lithium was added. The reaction was completed after 40 minutes. Hereafter, 1.46 mL diethoxypropane was added, followed by the addition of 418 g of butadiene in 10 minutes. The temperature of the reaction mixture rose to 60° C. The polymerisation was allowed to proceed at this temperature for 85 minutes. At this point in the polymerisation a sample is taken from the reaction and anlysed by GPC ASTM D3536. Then the coupling agent as listed in Table 1 was added. For polymers 1 to 5 and 10 to 17 the molar amount of coupling agent added, is half of that of the mmols of sec-butyl lithium. For polymers 8 to 9 and 18 the molar amount of coupling agent added is 0.25 times that of the mmols of sec-butyl lithium.

The reaction mixture was allowed to stand for 30 minutes at 60° C. After cooling down the reaction mixture, 0.6% by weight of IONOL on polymer was added for stabilisation. The product was isolated by steam stripping to give white crumbs.

Except for the coupling agent, the variation of the polymers listed in Table 1 is obtained by altering the amount of sec-butyl lithium and/or amount of DEP to get the apparent molecular weight as listed in column 4 in Table 1.

General Procedure B 90 g styrene was added to 6 liters of cyclohexane at 50° C., after which 4.16 mmol of sec-butyl lithum was added.

The reaction was completed after 40 minutes. Hereafter, 1.46 mL diethoxypropane was added, followed by the addition of 418 g of butadiene in 10 minutes. The temperature of the reaction mixture rose to 60° C. The polymerisation was allowed to proceed at this temperature for 85 minutes. Hereafter the second portion of 90 g styrene is added in 1 minute. The polymerisation is allowed to proceed at 60° C. for 15 minutes before 0.5 mL of ethanol is added to terminate the polymerisation. After cooling down the reaction mixture, 0.6 wt % of IONOL, relative to the weight of the polymer were added for stabilisation. The product was isolated by steam stripping to give white crumbs.

The variation of the polymers listed in Table 1 is obtained by altering the amount of sec-butyl lithium and amount of DEP to get the apparent molecular weight as listed n column 5 for polymer 6, 7 and 19 in Table 1.

Details of comparison polymers are given in Table 2 below.

EXAMPLE 20

A blend of 12% by weight of polymer in bitumen was prepared for each of Examples 1 to 9 and for each of the comparison examples by the following procedure in which a Silverson LR2 high shear mixer was used:

The bitumen was heated to 160° C. and subsequently the polymer was added. During polymer addition the temperature increased to 180° C., which is caused by the energy input of the mixer. At 180° C. the temperature was kept constant by on/off switching of the high shear mixer. Blending was continued until a homogeneous blend was obtained which was monitored by fluorescence microscopy. Generally the blending time was around 60 minutes.

The bitumen grade used for this example is a compatible bitumen, designated PX-200 and having a penetration of 200.

TABLE 1

| Polymer of Example No. | Polystyrene Content (%)[1] | Vinyl Content (%)[2] | Diblock (Mw) kg/mol (× 10³) (3) | Final Mw kg/mol (× 10³) (3) | Preparation Route | Coupling Agent (4) | Coupling Efficiency (%) |
|---|---|---|---|---|---|---|---|
| 1 | 30 | 58 | 161 | 299 | A | MDCS | 95 |
| 2 | 30 | 47 | 165 | 304 | A | MDCS | 89 |
| 3 | 30 | 64 | 136 | 255 | A | MDCS | 97 |
| 4 | 30 | 42 | 145 | 268 | A | MDCS | 91 |
| 5 | 32 | 52 | 124 | 236 | A | MDCS | 96 |
| 6 | 31 | 52 | 117* | 235 | B | — | full seq. |
| 7 | 31 | 55 | 134* | 268 | B | — | full seq. |
| 8 | 31 | 51 | 120 | 415 | A | GPTS | 86 |
| 9 | 31 | 52 | 147 | 502 | A | GPTS | 82 |
| 10 | 20 | 69 | 141 | 280 | A | DMDCS | 96 |
| 11 | 20 | 72 | 142 | 284 | A | DMDCS | 67 |
| 12 | 30 | 68 | 124 | 248 | A | DMDCS | 98 |
| 13 | 30 | 69 | 140 | 280 | A | DMDCS | 80 |
| 14 | 30 | 72 | 107 | 211 | A | DMDCS | 64 |
| 15 | 30 | 72 | 136 | 269 | A | DMDCS | 65 |
| 16 | 30 | 72 | 150 | 300 | A | DMDCS | 66 |
| 17 | 30 | 59 | 120 | 235 | A | MDCS | 83 |
| 18 | 30 | 61 | 115 | 386 | A | SiCl$_4$ | 78 |
| 19 | 30 | 66 | 161* | 321 | B | — | full seq. |

Key
*estimated
[1]by weight; measured according to ASTM 3314
[2]by weight of butadiene block, measured by IR spectroscopy generically as in ASTM 3677
[3]weight average molecular weight; measured by GPC (ASTM 3536) as detected by UV absorption.
[4]weight ratio of amount of material formed by coupling to the total amount of living "diblock" present before coupling
DMDCS: dimethyldichlorosilane
MDCS : methyldichlorosilane
SiCl$_4$: silicon tetrachloride
GPTS: gamma-glycidoxy-propyltrimethoxysilane

TABLE 2

| Comparison Polymer | Polystyrene Content (%)[1] | Vinyl Content (%)[2] | Diblock (Mw) kg/mol (× 10³) (3) | Final kg/mol (× 10³) (3) | Preparation Route | Coupling Agent | Coupling Efficiency (%) |
|---|---|---|---|---|---|---|---|
| C1 | 30 | 37 | 176 | 325 | A | MDCS | 96 |
| C2 | 30 | 44 | 176 | 321 | A | MDCS | 96 |
| C3 | 30 | 53 | 176 | 332 | A | MDCS | 96 |
| C4 | 30 | 64 | 176 | 326 | A | MDCS | 95 |
| C5 | 30 | 64 | 181 | 335 | A | MDCS | 92 |
| C6 | 30 | 53 | 199 | 363 | A | MDCS | 94 |
| C7 | 30 | 45 | 202 | 368 | A | MDCS | 94 |

The polymer-bitumen blends were then tested for suitability for roofing applications. The evaluations for both cold temperature and high temperature performance initially and after 6 months ageing time for the polymer blends of the invention and for the comparison blends are given in Table 3 below. The test methods used were:

Viscosity: evaluated at 180° C. using a Haeke roto-viscometer and a shear rate of 20 $s^{-1}$ and 100 $s^{-1}$ Cold bend (CB): evaluated under DIN 52123

Flow Resistance Temperature: evaluated under DIN 52123

The ageing characteristics of the polymer-bitumen blends were determined by a laboratory ageing test recommended by UEAtc (Union Europeenne pour L'Agrément Technique dans la Construction) which involves treatment in a dark air-ventilated oven at 70° C. for 6 months. In Table 3, the initial and the 6 months' aged values are given; the difference between the two (the Δ value) is also given. Desirably the Δ value should be as low as possible. The higher the value the shorter the estimated lifetime for the tested composition.

From Table 3 it can clearly be seen that although generally the low temperature properties and stability as shown by the cold bend temperature are good for all blends containing high vinyl-containing polymers, those blends having the specified range of diblock content additionally show advantageous high temperature properties of a generally lower viscosity and a retained flow resistance temperature over time which reflects an advantageously longer estimated service life in use. The comparison examples generally have a higher viscosity and a far higher Δ value for the flow resistance temperature showing a significant reduction in this high temperature property over time.

TABLE 3

| Polymer of Example No | Viscosity at 180° C. (Pas) | | Flow Resistance Temperature (°C.) | | | Cold Bend Temperature (°C.) | | |
|---|---|---|---|---|---|---|---|---|
| | 20 $s^{-1}$ | 100 $s^{-1}$ | Initial | Aged | Δ | Initial | Aged | Δ |
| 1 | 6 | 4 | 110 | 85 | 25 | −20 | −10 | 10 |
| 2 | 7 | 5 | 110 | 90 | 20 | −25 | −25 | 0 |
| 3 | 3 | 3 | 100 | 80 | 20 | −20 | −15 | 5 |
| 4 | 4 | 4 | 100 | 80 | 20 | −25 | −20 | 5 |
| 5 | 2 | 2 | 95 | 80 | 15 | −25 | −20 | 5 |
| 6 | 2 | 2 | 95 | 90 | 5 | −25 | −20 | 5 |
| 7 | 3 | 3 | 105 | 100 | 5 | −20 | −30 | −10 |
| 8 | 2 | 2 | 95 | 90 | 5 | −25 | −20 | 5 |
| 9 | 5 | 3 | 105 | 100 | 5 | −20 | −25 | −5 |
| C1 | 8 | 6 | 110 | 80 | 30 | −25 | −15 | 10 |
| C2 | 8 | 6 | 115 | 85 | 30 | −25 | −20 | 5 |
| C3 | 6 | 5 | 110 | 80 | 30 | −25 | −15 | 10 |
| C4 | 5 | 4 | 115 | 85 | 30 | −20 | −15 | 5 |
| C5 | 6 | 4 | 105 | 75 | 30 | −20 | −20 | 0 |
| C6 | 7 | 5 | 115 | 80 | 35 | −20 | −30 | −10 |
| C7 | 8 | 6 | 120 | 80 | 40 | −20 | −20 | 0 |

EXAMPLE 21

For the polymers of Examples 10 to 19, 12% by weight polymer blends in bitumen grade PX-200 were prepared by the blending procedure of Example 20 and the initial high and low temperature properties were evaluated. The results are given in Table 4.

TABLE 4

| Polymer of Example No. | Viscosity at 180° C. (Pas) 20 $s^1$ | Flow Resistance Temperature (°C.) | Cold Bend Temperature (°C.) |
|---|---|---|---|
| 10 | 3 | 80 | −15 |
| 11 | 3 | 80 | −20 |
| 12 | 2 | 90 | −10 |
| 13 | 3 | 90 | −5 |
| 14 | 1 | 80 | −10 |
| 15 | 2 | 95 | −15 |
| 16 | 2 | 90 | −10 |
| 17 | 2 | 90 | −25 |
| 18 | 2 | 95 | −20 |
| 19 | 4 | 95 | −25 |

The polymer blends of Table 4 also exhibit favourable "high temperature" viscosity, and acceptable flow resistance and cold bend temperatures.

EXAMPLE 22

In this Example, certain of the polymers of the invention were blended, using the blending procedure of Example 20, with a different, incompatible bitumen grade, designated B-180, having a penetration of 180, to establish whether the advantageous properties noted above extend consistently to blends with other bitumens.

Details of the resulting evaluations of the high and low temperature properties (carried out as in Example 20) are given in Table 5 below.

The favourable properties of the polymer-blends of the invention are indeed maintained with other bitumen grades.

TABLE 5

| Polymer of Example No | Viscosity at 180° C. (Pas) | | Flow Resistance Temperature (°C.) | | | Cold Bend Temperature (°C.) | | |
|---|---|---|---|---|---|---|---|---|
| | 20 $s^{-1}$ | 100 $s^{-1}$ | Initial | Aged | Δ | Initial | Aged | Δ |
| 6 | 2 | 2 | 95 | 85 | 10 | −25 | −10 | 15 |
| 7 | 2 | 2 | 105 | 85 | 20 | −25 | −10 | 15 |
| 8 | 2 | 1 | 95 | 85 | 10 | −25 | −10 | 15 |
| 9 | 2 | 2 | 105 | 85 | 20 | −20 | −15 | 5 |

We claim:

1. A bituminous composition which comprises a bituminous component and a block copolymer of a conjugated diene and a monovinylaromatic hydrocarbon, wherein the block copolymer has a vinyl content of from 50 to 55% by weight based on the total diene content and a diblock content of 25 wt % or less, whereas the diblock has an apparent molecular weight as measured with gel chromatography using polystyrene calibration standards according to ASTM 3536 which is in the range of from 110,000 to 150,000.

2. A bituminous composition as claimed in claim 1 wherein the bituminous composition has a viscosity at 180° C. of in the range of from 1 to 8 Pas and a change of flow resistance temperature and of cold bend temperature over 6 months in the UEAtc laboratory ageing test of 25° C. or less.

* * * * *